(12) United States Patent
Ternovsky

(10) Patent No.: US 7,263,109 B2
(45) Date of Patent: Aug. 28, 2007

(54) CLOCK SKEW COMPENSATION FOR A JITTER BUFFER

(75) Inventor: Igor Ternovsky, Netania (IL)

(73) Assignee: Conexant, Inc., Red Bank, NJ (US)

(*) Notice: Subject to any disclaimer, the term of this patent is extended or adjusted under 35 U.S.C. 154(b) by 910 days.

(21) Appl. No.: 10/063,005

(22) Filed: Mar. 11, 2002

(65) Prior Publication Data

US 2003/0169755 A1 Sep. 11, 2003

(51) Int. Cl.
*H04J 3/06* (2006.01)
(52) U.S. Cl. .................... 370/503; 370/516
(58) Field of Classification Search .......... None
See application file for complete search history.

(56) References Cited

U.S. PATENT DOCUMENTS

| | | | |
|---|---|---|---|
| 4,270,183 A | | 5/1981 | Robinson et al. |
| 4,922,438 A | | 5/1990 | Ballweg |
| 5,652,627 A | * | 7/1997 | Allen ...................... 348/497 |
| 5,757,871 A | | 5/1998 | Furukawa et al. |
| 5,790,543 A | | 8/1998 | Cloutier |
| 5,825,771 A | | 10/1998 | Cohen et al. |
| 5,966,387 A | | 10/1999 | Cloutier |
| 6,161,160 A | | 12/2000 | Niu et al. |
| 6,298,057 B1 | | 10/2001 | Guy et al. |
| 6,327,276 B1 | | 12/2001 | Robert et al. |
| 6,360,271 B1 | | 3/2002 | Schuster et al. |
| 6,366,959 B1 | | 4/2002 | Sidhu et al. |
| 6,922,731 B1 | * | 7/2005 | Morioka et al. ............ 709/231 |
| 2001/0012300 A1 | | 8/2001 | Raisanen |
| 2001/0020280 A1 | | 9/2001 | Bastin |
| 2001/0055276 A1 | * | 12/2001 | Rogers et al. ............. 370/232 |
| 2002/0007429 A1 | | 1/2002 | Boulandet |
| 2002/0009054 A1 | * | 1/2002 | Suzuki et al. ............. 370/252 |
| 2002/0026310 A1 | | 2/2002 | Mochida et al. |
| 2002/0075857 A1 | | 6/2002 | LeBlanc |
| 2002/0078225 A1 | | 6/2002 | Pines |

* cited by examiner

*Primary Examiner*—Doris H. To
*Assistant Examiner*—Thien D. Tran
(74) *Attorney, Agent, or Firm*—Thomas, Kayden, Horstemeyer & Risley

(57) ABSTRACT

A method and system to minimize the potential of jitter buffer underflow/overflow resulting from a difference in sampling rates of an audio encoder and an audio decoder are disclosed herein. The difference in sampling rates, or clock skew, can be determined from a difference between an actual amount of data stored in a jitter buffer and the desired, or threshold, amount. A subset of packets from a sequence of packets output to the audio decoder can be altered to compensate for the clock skew, whereby the amount of data associated with the subset of packets is decreased when the sampling rate of the encoder is greater than the sampling rate of the decoder, and the amount of data is increased when the sampling rate of the encoder is less than the sampling rate of the decoder. The present invention finds particular advantage in providing audio data via a packet-switched network.

30 Claims, 4 Drawing Sheets

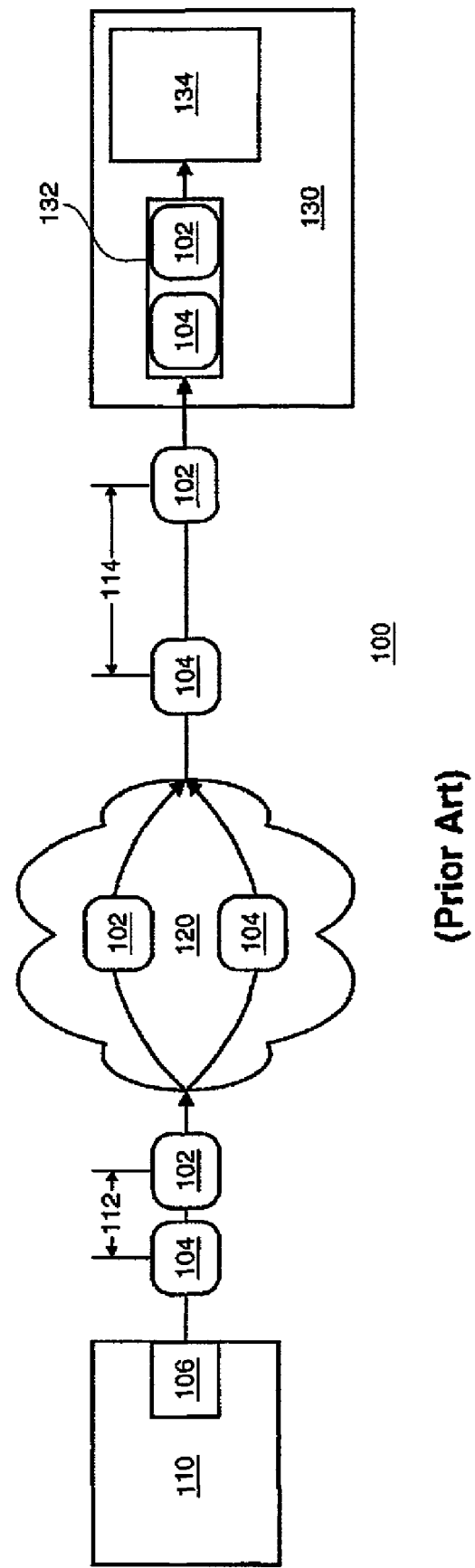

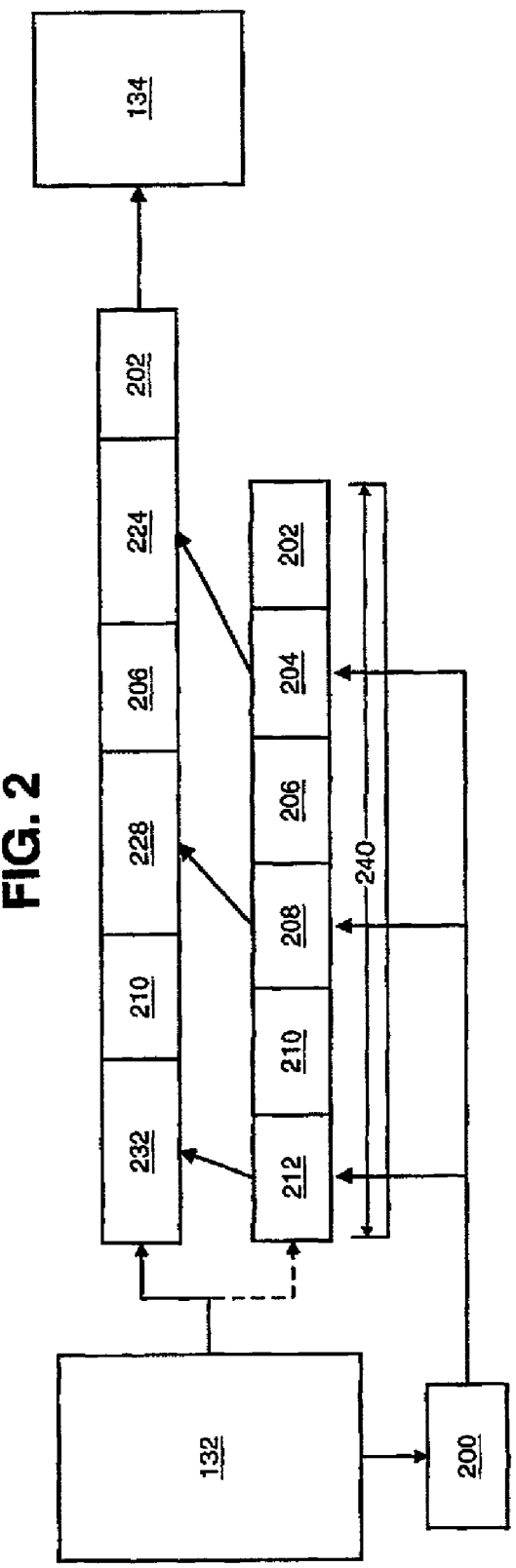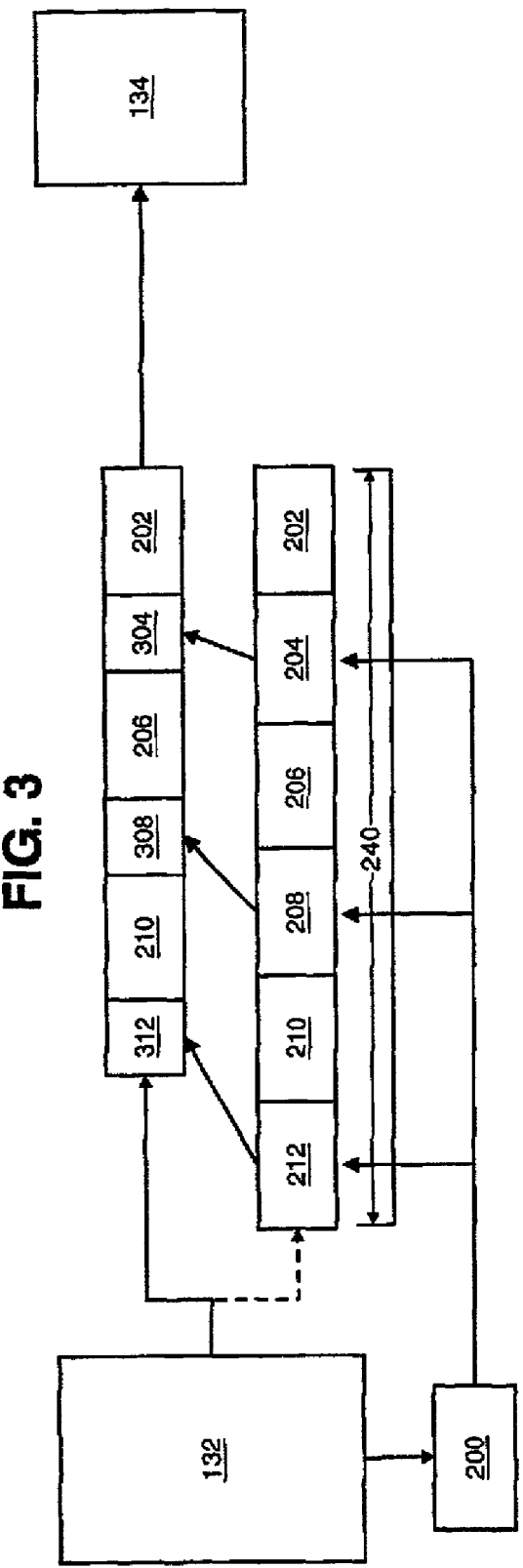

CLOCK SKEW COMPENSATION FOR A JITTER BUFFER

BACKGROUND OF THE INVENTION

The present invention relates generally to improving the quality of audio data sent over packet switched networks, and more particularly to preventing overflow/underflow at a jitter buffer to minimize undesirable audio effects.

Various methods have been developed to deliver real-time audio data from an audio source to a destination over packet-switched networks. These techniques, such as voice over Internet Protocol (VoIP) and voice over frame relay (VoFR), often provide a number of advantages to using circuit-switched networks, such as a public switched telephone network (PSTN). For one, the cost of using packet-switched networks to transport audio data often is less expensive than with circuit-switched networks. Another advantage is that packet-switched networks often provide redundancy paths since there are typically numerous possible paths between the source and destination, thereby making packet-switched audio transmission techniques more resilient to node failures in a network.

However, in spite of the many advantages offered by transmitting audio data via packet-switched networks, a number of drawbacks exist. Referring now to FIG. 1, some of the limitations of known packet-switched audio transmission methods are illustrated. One limitation typically exhibited by packet-switched networks includes latency and jitter. Since the protocols often used to provide packet-switched voice data, such as IP, generally do not provide any type of quality of service (QoS), there is no guarantee that the packets containing the audio data will be transported to a destination either in order or within a maximum time period. Likewise, typically there is no guarantee that the packets will have the same latency, often resulting in jitter, where the term jitter commonly refers to the variation in the latency between packets.

To illustrate, assume that system 100 includes an audio source 110 and a destination system 130. The audio source 110 and the destination system 130 can include any of a variety of data terminal devices, such as a personal computer, a laptop computer, a digital telephone, a video teleconferencing system, and the like. In this case, the audio source 110 can encode an audio source signal into digital audio data using an audio encoder 106, packetize the audio data into packets 102, 104, and transmit the packets 102, 104 via a network 120 to the destination system 130 for decoding and subsequent output as an audio signal by an audio decoder 134.

However, networks, such as the Internet, often have numerous possible paths between a source and a destination, as well as varying traffic and changes in the statuses of nodes. As a result, packet 102 could take a different path through network 120 than the path taken by packet 104. As a result, there could be a significant difference between the transmission latency of packet 102 and the transmission latency of packet 104. For example, assume that packet 104 is transmitted by the audio source 110 50 milliseconds (time 112) after packet 102. However, in this example, packet 102 is transmitted along path 122 of network 120 for a transmission time of 250 ms, and packet 104 is transmitted along path 144 of network 120 for a transmission time of 300 ms. As a result, packet 102 is received by the destination system 130 100 ms (time 114) before packet 104 is received, rather than the original 50 ms time difference (time 112). This latency can vary for subsequent packets and can even cause packets to arrive out-of-order at the destination system 130.

As a result of the potential for jitter on packet-switched networks, many destination systems, such as destination system 130, typically implement a jitter buffer 132 to buffer the incoming packets to minimize the effects of the jitter introduced by the network 120. However, because of the varying latencies of packets transmitted to the destination system 130 and stored in the jitter buffer 132, the jitter buffer 132 can overflow or underflow, resulting in a significant delay before the jitter buffer 132 can pass audio data to the audio/voice decoder for output. In voice/audio applications, this delay often introduces undesirable audio components to the output, such as audible clicks, that often degrade the quality of the audio output. For example, a jitter buffer overflow often results in dropped packets, thereby causing a discontinuity in the output. Underflow of a jitter buffer typically results in a shifting in the time domain of the audio output while the jitter buffer replenishes, causing silence at the output during the replenishment period.

The potential for overflow/underflow of the jitter buffer 132 often is exacerbated when there is a difference between the sampling rate of the audio encoder 106 at the audio source 110 and the sampling rate of the audio decoder 134 at the destination system 130; this difference is referred to herein as clock skew. The clock skew can result from a difference between the nominal sampling rates of the audio encoder 106 and the audio decoder 134. For example, the audio encoder 106 could be set to encode an audio signal at a rate of 8,000 samples per second and the audio decoder 134 could be set to decode audio data at a rate of 7,900 samples per second, resulting in a clock skew of 100 samples per second. Alternatively, the clock skew can be a result of the variance of the clocks used by the audio encoder 106 and the audio decoder 134. For example, both audio encoder 106 and the audio decoder 134 could be adapted to encode/decode at a rate of 8000 samples per second. However, because of a 0.1% variance in the clocks of the encoder 106 and the decoder 134, there could be a total clock skew of between 0.0% and 0.2%, or 0 to 16 samples/second.

In the event that the sampling rate of the audio decoder 134 is greater than the sampling rate of the audio encoder 106, the jitter buffer 132 generally would eventually underflow since the packets are output from the jitter buffer 132 at a greater rate than other packets are input. As a result, packets typically would be dropped by the jitter buffer 132, resulting in periods of silence until the jitter buffer 132 repopulates. Likewise, if the sampling rate of the audio decoder 134 is less than the sampling rate of the audio encoder 106, then the jitter buffer 132 would eventually overflow since packets are input to the jitter buffer faster than previously received packets are removed, resulting in dropped packets and degraded output audio quality.

Accordingly, a system and/or method to compensate for a clock skew between an audio encoder and an audio decoder would be advantageous.

SUMMARY OF THE INVENTION

The disclosed technique mitigates or solves the above-identified limitations in known solutions, as well as other unspecified deficiencies in the known solutions.

Jitter buffers typically are essential components of audio decoding devices that compensate for variable jitter and delay when delay sensitive data is passed over packet networks. When a jitter buffer underflows or overflows, there generally is a significant delay in until the jitter buffer is prepared to pass audio data again. In most voice applications, this delay is audible and may lead to poor voice quality. The present invention describes clock skew compensation logic that works in conjunction with a jitter buffer in voice and other audio applications. This logic is adapted to compensate for the difference in the sampling rate of an encoder and a decoder (i.e., the clock skew), minimizing the potential for underflow/overflow of the jitter buffer, and thereby improving audio/voice quality.

The clock skew compensation logic, in at least one embodiment, statistically determines the difference between the sampling rates of the encoder and the decoder. Based on this difference, the clock skew compensation logic can select packets or frames in the jitter buffer and modify the selected packets/frames to compensate for the difference. The modification of the packets/frames can include removing/adding samples for sample-based encoders/decoders or adding/removing frames for frame-based encoders/decoders. By modifying the samples/frames to compensate for the clock skew, the clock skew compensation logic maintains the jitter buffer within nominal thresholds, thereby preventing packet discards or periods of silence.

In accordance with one embodiment of the present invention, a method for processing packets of data is provided, the method comprising the steps of receiving, at a jitter buffer, a sequence of packets encoded at a first sampling rate by an audio encoder, wherein each packet includes audio data having at least one sample, and determining a clock skew between the audio encoder having the first sampling rate and an audio decoder having a second sampling rate, the clock skew representative of a difference between the first sampling rate and the second sampling rate. The method further comprises the steps of selecting a subset of packets from the sequence of packets based on a magnitude of the clock skew, and altering each packet of the subset of packets before the packet is provided to the audio decoder to collectively compensate for the clock skew.

In accordance with another embodiment of the present invention, a method to minimize the underflow and overflow of a jitter buffer is provided. The method comprises the steps of receiving, at the jitter buffer, a sequence of packets from an audio encoder having a first sampling rate, each packet of the sequence of packets including audio data having at least one sample, determining a difference between an actual amount of data stored in the jitter buffer and a threshold, wherein the difference represents a clock skew between the first sampling rate and a second sampling rate, and selecting a subset of packets to be altered from the sequence of packets, wherein a number of packets included in the subset is based on the difference. The method further comprises the steps of determining an alter amount based on a relationship between the difference and the number of packets in the subset, and altering, by the alter amount, each packet of the subset of packets, wherein a total amount of audio data of a packet is decreased when the actual amount of data is greater than the threshold, and wherein the total amount of audio data of a packet is increased when the actual amount of data is less than the threshold.

In yet another embodiment in accordance with the present invention, a computer readable medium is provided. The computer readable medium comprises a set of executable instructions adapted to manipulate a processor to receive, at a jitter buffer, a sequence of packets encoded at a first sampling rate by an audio encoder, wherein each packet includes audio data having at least one sample, and to determine a clock skew between the audio encoder having the first sampling rate and an audio decoder having a second sampling rate, the clock skew representative of a difference between the first sampling rate and the second sampling rate. The set of instructions further is adapted to manipulate the processor to select a subset of packets from the sequence of packets based on a magnitude of the clock skew, and to alter each packet of the subset of packets before the packet is provided to the audio decoder to collectively compensate for the clock skew. In an additional embodiment in accordance with the present invention, a system is provided in a system for communicating audio data, the system comprising a first data terminal device having an audio encoder, wherein the first data terminal device is adapted to transmit audio data encoded at a first rate over a communications network, and a second data terminal device coupled to the first data terminal device, the second data terminal having a jitter buffer for receiving incoming audio data over a communications network and an audio decoder for decoding audio data at a second rate, and wherein the second data terminal device is adapted to modify a size of the incoming audio data to compensate for a difference between the first rate and the second rate.

In yet another embodiment in accordance with the present invention a data terminal device to process audio data is provided. The data terminal device comprises a jitter buffer for receiving incoming audio data encoded at a first rate, a decoder to decode the incoming audio data at a second rate, and means for modifying a size of the incoming audio data to compensate for a difference between the first rate and the second rate.

One objective of the present invention is to provide high voice quality in the presence of constant clock skew between an encoder and a decoder when it is not possible to compensate for the skew by altering the sampling rates of the encoder and/or the decoder. The present invention achieves this objective by altering packets containing voice samples or compressed voice frames when a jitter buffer is close to underflowing/overflowing instead of dropping complete packets or adding long periods of silence. Another objective of the present invention is to provide a solution to the problems presented by constant clock skew that has a low overhead, highly efficient, and consumes relatively little processing time.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which: FIG. 1 is a block diagram illustrating known packet-switched audio transmission system subject to the effects of latency and jitter in the decoding and output of packetized audio data; FIGS. 2 and 3 are block diagrams illustrating implementations for altering selected packets of a sequence of packets to manage a rate of output of audio data from a jitter buffer in accordance with at least one embodiment of the present invention.

DETAILED DESCRIPTION OF THE PREFERRED EMBODIMENTS

Figure 4:
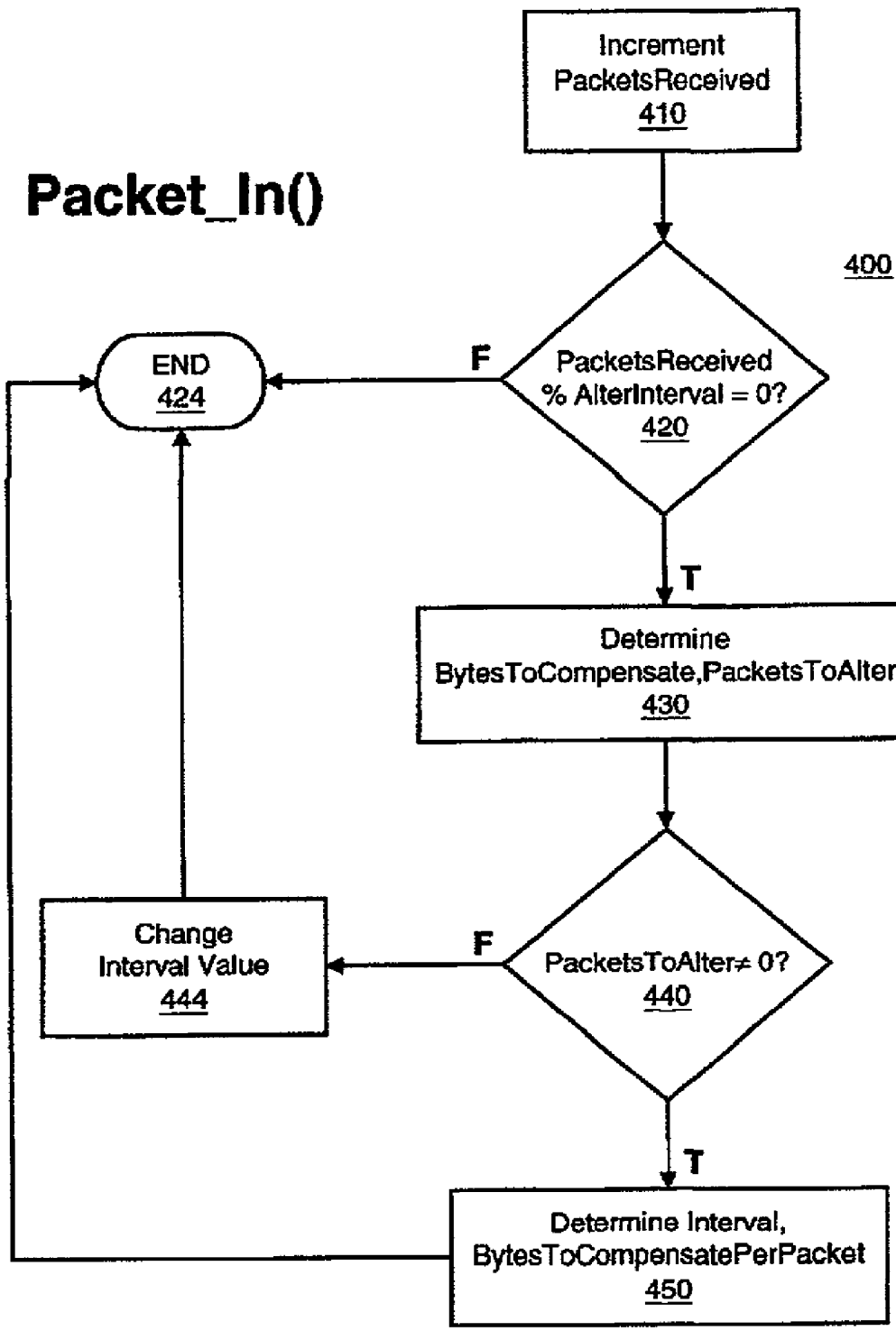
FIGS. 4 and 5 are flow diagrams illustrating a mechanism for compensating for clock skew in accordance with at least one embodiment of the present invention.

FIGS. 2–5 illustrate a method and a system to minimize the potential for jitter buffer overflow/underflow caused by a difference between the sampling rates of a source audio encoder and a destination audio decoder. In at least one embodiment, one or more packets of a sequence of packets received from an audio encoder are altered before the sequence of packets is provided to an audio decoder. When the sampling rate of the encoder is greater than the sampling rate of the decoder, the amount of audio data for each of the selected packets is reduced to increase the rate by which the decoder processes data from the jitter buffer. Alternatively, when the sampling rate of the encoder is less than the sampling rate of the decoder, the amount of audio data for each of the selected packets is increased to reduce the rate by which the decoder processes data from the jitter buffer. As a result, the difference between the rate at which data is supplied to the jitter buffer and the rate at which data is supplied from the jitter buffer is minimized or eliminated, thereby minimizing or eliminating the potential for jitter buffer underflow/overflow. The methods and system disclosed herein can be implemented as software, firmware, hardware, or a combination thereof.

Referring now to FIGS. 2 and 3, a method of preventing underflow of a jitter buffer by compensating the difference between the sampling rate of an audio source and the sampling rate of a destination system is illustrated in accordance with at least one embodiment of the present invention. As discussed previously, a difference between the sampling rate of the audio encoder 106 and the audio decoder 134 often results in an eventual underflow/overflow of the jitter buffer 132 due to the difference between the data input rate and the data output rate. Accordingly, in at least one embodiment, the packets of audio data provided from the jitter buffer 132 to the decoder 134 for processing are altered by a clock skew compensation logic (CSCL) 200 to compensate for the clock skew between the source and destination sampling rates. When the sampling rate of the decoder 134 is greater than the sampling rate of the encoder 106, the positive difference is detected and the CSCL 200 enlarges one or more packets before they are provided to the decoder 134, thereby decreasing the output rate of data from the jitter buffer 132. Conversely, when the sampling rate of the decoder 134 is less than the sampling rate of the encoder 106, the negative difference is detected and the CSCL 200 reduces one or more packets before they are provided to the decoder 134, thereby increasing the output rate of data from the jitter buffer 132. The CSCL 200 can be implemented as software/firmware, such as executable instructions performed by a processor (the decoder 134, for example), as hardware, such as a state machine, a programmable logic device, or an application specific integrated circuit, or as a combination of hardware and software/firmware.

In one embodiment, the clock skew compensation logic 200 determines the status of the jitter buffer 132 at regular intervals, herein referred to as alter intervals, where the alter intervals represent a specified sequence of packets received by the jitter buffer 132 or output by the jitter buffer 132. For example, if a total sequence of 3000 packets is received by the jitter buffer 132 and the alter interval is defined as a sequence of 600 packets, then the total sequence contains 5 alter intervals. The number of packets represented by an alter interval can be selected based on a variety of factors, including the size of the jitter buffer 132, the accuracy of the clocks of the encoder 106 and/or the decoder 134, and the like. In one embodiment, the alter interval is determined based the relation between the accuracy of the encoder 106/decoder 134 and the depth (i.e., the size) of the jitter buffer 132. To illustrate, if the clock accuracy for the encoder 106 and/or the decoder 134 is 0.1%, then the jitter buffer 132 will gain/lose approximately 1 packet out of every 1000 packets. Accordingly, care must be taken to chose an alter interval that prevents overflow or starvation of the jitter buffer 132. For example, if, in this case, the jitter buffer 132 has a depth of 4 packets and an alter interval of 6000 packets is selected, more than 4 packets could be gained or lost before an entire alter interval of packets is received at the jitter buffer 132, thereby causing an overflow or an underflow of the jitter buffer 132. In general, the alter interval is chosen such that the gain/loss of packets to the jitter buffer 132 is less than half of the depth of the jitter buffer 132. Using the previous example, an alter interval of between 1000 and 2000 packets would be appropriate, resulting in a loss/gain of no more than 2 packets (half the depth of the jitter buffer 132 in this example) while an alter interval of packets is received at the jitter buffer 132.

At the end of every alter interval, such as alter interval 240, certain properties of the jitter buffer 132 are determined by the CSCL 200. These properties can include the number of packets received, the number of bytes received, and the like. Additionally, an indicator of the difference between the actual amount of audio data stored in the jitter buffer and a threshold is determined, wherein the threshold represents an ideal or desired amount of audio data stored in the jitter buffer 132 that minimizes jitter without introducing unacceptable delay into the decoding of the audio data represented by the packets 202–212. This threshold can be indicated by an administrator, determined empirically from an analysis of the performance of the jitter buffer 132 and/or the decoder 134, and the like. In at least one embodiment, the threshold is based at least in part on the size of the jitter buffer 132. In this case, it generally is desirable to set the threshold to about half of the size of the jitter buffer 132. For example, if the jitter buffer 132 has a capacity to store 120 ms of audio data, then the threshold typically is set at about 60 ms of audio data. By setting the threshold to half of the size of the jitter buffer 132, a balance may be obtained between potential overflow and potential underflow of the jitter buffer 132.

This difference between the actual amount of data and the threshold generally is representative of the clock skew between the encoder 106 and the decoder 134 over a period of time (such as an alter interval), and therefore, in at least one embodiment, is representative of the amount of data by which the packets of the next alter interval are to be enlarged or reduced, depending on whether the clock skew is positive or negative. In one manner, by performing an integer division of this difference by the data size of a sample, the number of samples to be added or removed can be determined and by determining the minimum of either the number of samples to be altered or the number of packets in a packet sequence (the alter interval), the number of packets to be altered can be determined.

Note that there are two common types of audio encoders/decoders, one type which encodes audio data based on a sampling of the audio signal, and the other type which encodes an audio signal as a sequence of frames, where a frame typically is the smallest unit of encoded audio data that can be decoded by an audio decoder in the absence of previous or subsequent audio data. For ease of discussion, the term sample is used herein to refer to both samples and frames and applies to both sample-based and frame-based encoding/decoding schemes unless otherwise noted.

In the example illustrated in FIG. 2, the alter interval 240 includes 6 packets 202–212, each packet consisting of 6 samples, each sample having 1 byte of audio data. Note that packets typically include 80–100 samples, however for ease of illustration, it is assumed that the packets include 6 samples each. In this example, the sampling rate of the encoder 106 is less than the sampling rate of the decoder 134. When the sampling rate of the decoder 134 is greater than the sampling rate of the encoder 106, there is an increased potential for the jitter buffer 132 to underflow since the audio data is provided to the decoder 134 faster than the audio signal is encoded by the encoder 106. To illustrate, if the sampling rate of the encoder 106 is 7,600 samples/second and the sampling rate of the decoder 134 is 8,000 samples per second, there is a 400 samples/second negative difference or deficit between the two sampling rates. Accordingly, the amount of audio data stored in the jitter buffer 132 would be depleted at a rate of 400 samples/second, assuming that the data is stored in the jitter buffer 132 at the same rate that it is encoded by the encoder 106. As a result of the underflow of the jitter buffer 132, the output of audio data to the decoder 134 for output as an audio signal generally is paused until the jitter buffer 132 can replenish, resulting in undesirable audio artifacts, such as pauses and/or clicks.

However, in accordance with at least one embodiment of the present invention, the potential for jitter buffer underflow/overflow is minimized or eliminated by altering the amount of audio data in an alter interval by an amount approximate or equivalent to the magnitude of the clock skew during a previous alter interval. To illustrate with reference to FIG. 2, during a previous alter interval, the CSCL 200 or the jitter buffer 132 determined that the amount of data in the jitter buffer 132 was 3 bytes below the desired threshold. In one embodiment, the CSCL 200 alters a subset of the packets 202–212 of alter interval 240 (subsequent to the previous alter interval) so that the total data size of the packets of the alter interval 240 increases by 3 bytes to compensate for the difference between the actual amount of data in the jitter buffer 132 and the desired threshold (i.e., the magnitude of the clock skew). In the illustrated embodiment, the CSCL 200 can enlarge the subset of packets by adding one or more samples to each packet. Since the amount to compensate in this example is 3 bytes, 3 samples total (3 bytes/1 byte/sample) are to be added to the some or all of packets 202–212 before the packets are provided to the decoder 134 for processing.

A variety of methods may be utilized to determine the number of packets to alter, to determine which of packets 202–212 are to be selected for altering, and to determine the extent to which each of the selected packets are to be altered. For example, the packets can be randomly selected, selected in a predetermined fashion, selected from the first packets of the alter interval, selected as the last packets of the alter interval, and the like. Likewise, the amount of data (i.e., number of samples) added/removed from one selected packet can be different from another selected packet. However, in at least one embodiment, it is preferable to minimize the amount by which any given packet is altered as well as to distribute the altered packets as evenly as possible throughout the alter interval 240. With this goal, the number of packets to be altered can be determined by the minimum of either the number of packets in the alter interval 240 or the number of samples to be added/removed. As a result, no more than one sample is added/removed from each packet of the alter interval 240, minimizing undesirable audio artifacts resulting from any altering process performed.

Likewise, to ensure that the altered packets are essentially evenly distributed among the alter interval 240, a distribution interval can be determined, where the distribution interval is equivalent to the integer division of the number of packets within the alter interval 240 by the number of packets to be altered. In this case, each packet in a position of the alter interval 240 that is an integer multiple of the distribution interval is selected for alteration. To illustrate with reference to FIG. 2, the alter interval 240 is b 6 l packets in length and there are three samples to be altered, as determined previously. Therefore three packets of the six will be altered, resulting in a distribution interval of 2 packets (6 packets/3 packets to be altered). Accordingly, every other packet of packets 202–212 is selected for modification. In this case, the selected packets include packets 204 (position 2), 208 (position 4), and 212 (position 6).

The selected packets 202, 208, 212 are enlarged by 1 sample each (as determined previously) resulting in enlarged packets 224, 228, and 232, respectively, each having 7 samples for a total increase of 3 samples, or 3 bytes, thereby compensating for the difference between the actual amount and the threshold amount of data in the jitter buffer 132. Any of a variety of methods of increasing the number of samples in a packet known to those skilled in the art may be utilized. For example, to enlarge packet 202 to generate enlarged packet 224, one of the six samples could be copied and the copy could be inserted into the sample sequence immediately after the copied sample, resulting in a total of seven samples in the packet 224. Likewise, if a packet is to be enlarged by multiple samples, a random or distributed selection of samples can be copied and placed into the sample sequence immediately after the respective copied sample.

By enlarging the selected subset of packets 202–212 before they are provided to the decoder 134, the disparity between the sampling rate of the encoder 106 and the decoder 134 can be minimized. Because, in this case, the decoder 134 consumes data from the jitter buffer 132 faster than it is provided to the jitter buffer 132 by the encoder 106, the jitter buffer 132 would underflow without modification. However, by increasing the amount of data (i.e., the number of samples) represented by some or all of the packets 202–212, the data input rate requirement of the decoder 134 can be satisfied without depleting the jitter buffer 132. To illustrate, the original packet sequence 202, 204, 206, 208, 210, 212 has a total length of b 36 l samples, whereas the enlarged packet sequence 202, 224, 206, 228, 210, 232 has a total length of 39 samples, an increase of about 8.33%. If the former packet sequence is provided to the decoder 134 and the decoder 134 has a sampling rate of 60 samples/second, then it would take the decoder 134 0.6 seconds to decode the former packet sequence. However, it would take 0.65 seconds for the decoder 134 to decode the enlarged packet sequence. This 0.05 second difference allows the amount of audio data stored in the jitter buffer 132 to increase to the threshold, as desired.

A similar technique is applied when the sampling rate of the decoder 134 is less than the sampling rate of the encoder 106, as illustrated in FIG. 3. In this case, the jitter buffer 132 typically would eventually overflow as the audio data is input to the jitter buffer 132 faster than the audio data is provided to the decoder 134 for processing. To prevent underflow of the jitter buffer 132, in one embodiment, during each alter interval 240, some or all of packets 202–212 are selected to be altered by reducing the number of samples (i.e., amount of audio data) in selected packets.

As with the method discussed with reference to FIG. 2, the amount of data to compensate is calculated by determining the magnitude of the clock skew over a given time period, which, in at least one embodiment, is represented by the amount of data in the jitter buffer in excess of the specified threshold. This excess amount of data can be divided by the sample size to determine the number of samples to be removed from the alter interval 240. As with the enlargement method, the packets may be selected in a number of ways, preferably by evenly distributing the altered packets throughout the alter interval 240 by determining and applying a distribution interval. As with the previous example, assume that packets 202–212 each include 6 samples, each sample represented by 1 byte of audio data. Also assume that there are 3 bytes of audio data in excess of the desired threshold in the jitter buffer 132. Accordingly, the number of samples to be removed from the alter interval 240 is calculated as 3 samples, and if evenly distributed among the six packets 202–212, the packets 204, 208, and 212 can be selected for altering (using a distribution interval of 2 packets) to generate reduced packets 304, 308, 312.

As with the enlargement of packets, any method of reducing the amount of data associated with a selected packet known to those skilled in the art may be used. For example, to reduce the number of samples in packet 204 by one, a random sample from the six samples of packet 204 can be removed, resulting in a reduced packet 304 having only five packets.

By reducing the size of one or more of packets 202–212 before they are provided to the decoder 134, the potential for overflow of the jitter buffer 132 due to the clock skew between the encoder 106 and decoder 134 can be reduced. Since, the decoder 134 consumes data from the jitter buffer 132 slower than it is provided to the jitter buffer 132 by the encoder 106, the jitter buffer 132 would otherwise overflow. However, by decreasing the number of samples in some or all of the packets 202–212, the packets of audio data are retrieved from the jitter buffer 132 faster than they would if the original-length packets were provided to the decoder 134. To illustrate, the original packet sequence 202, 204, 206, 208, 210, 212 has a total length of 36 packets, whereas the reduced packet sequence 202, 304, 206, 308, 210, 312 has a total length of 33 packets, a decrease of about 8.33%. If this level of altering was repeated for all subsequent alter intervals, then the decoder 134 would consume data from the buffer at a rate 8.33% greater than without alteration of the packets, thereby compensating for the lower sampling rate relative to the encoder 106.

The altering of the packets of an alter interval can occur at any point between when a packet is to be stored in the jitter buffer 132 and when it is to be provided in altered form to the decoder 134. In one embodiment, the CSCL 200 calculates the excess/shortage of data within the jitter buffer 132, and the CSCL 200 compensates for the excess/shortage by altering the packets by the CSCL 200 before they are placed into the jitter buffer 132. In this case, as each incoming packet of an alter interval is received, the CSCL 200 determines if the packet is to be altered based on the location of the packet within the sequence of the alter interval. If the packet is to be altered, the CSCL 200 alters the packet by the desired amount and then places the altered packet into the jitter buffer 132. In another embodiment, the CSCL 200 alters the packets after they are stored in the jitter buffer 132. In this case, after an alter interval of packets is received by the jitter buffer 132, the CSCL 200 determines the amount of compensation and selects those packets of the alter interval that are to be altered. The CSCL 200 then alters the specified packets by the specified amount, and then repeats the alteration process on the next alter interval of packets.

For the CSCL 200 to modify an alter interval of packets before being stored or while they are in the jitter buffer 132, the CSCL 200 typically would consider data representing the internal structure of the jitter buffer 132 to perform the alteration. However, it may prove beneficial to provide a CSCL 200 that is not specific to any particular type or implementation of the jitter buffer 132. Accordingly, in one embodiment, the CSCL 200 alters packets as they are provided to the decoder 134. In this case, as the packet of an alter interval 240 is output from the jitter buffer 132, the CSCL 200 determines if the packet is to be altered based on the position of the packet within the alter interval 240. For example, an output packet could be randomly selected for modification from the alter interval, the packets at the beginning or the end of an alter interval can be selected, and the like. Recall, in one embodiment, the CSCL 200 determines a distribution interval (e.g., every other packet or every third packet), and if a packet is positioned in the alter interval at the end of this distribution interval, the packet is selected for modification. If so selected, a packet is altered and then provided in altered form to the decoder 134 for processing.

Accordingly, in this case, the CSCL 200 needs only to provide an interface between the jitter buffer 132 and the decoder 134, rather than considering data concerning the structure of the jitter buffer 132. For example, when the decoder 134 requests a packet from the jitter buffer 132 for decoding, the CSCL 200 could receive this request, forward a request of its own to the jitter buffer 132 for a packet, modify the packet if appropriate, and then forward the packet to the decoder 134. Alternatively, the jitter buffer 132 could receive the request from the decoder 134, forward the packet to the CSCL 200 as part of the packet output process, and the CSCL 200 could then forward the packet, altered if appropriate, to the decoder 134.

By determining a condition of the jitter buffer 132 (an excess/shortage of data) and modifying the operation of the system (altering packets provided to the decoder 134), at least one implementation of the present invention can be viewed as a feedback system. The rate of packets provided to the decoder 134 is modified based on magnitude of the clock skew (i.e., the difference between the actual and desired amount of data in the jitter buffer 132). When the amount of data is less than a desired threshold, the rate of packets provided to the decoder 134 is decreased by increasing packet size, thereby allowing the jitter buffer 132 to replenish at a complementary rate. Similarly, when the amount of data is more than the threshold, the rate of packets provided to the decoder 134 is increased by decreasing the packet size, thereby depleting the jitter buffer 132 at a complementary rate. As the actual amount of data stored in the jitter buffer 132 approaches the desired amount, or threshold, the degree to which the packets are altered is reduced accordingly. While, in one embodiment, the threshold is changed infrequently, if at all, in other embodiments, the value of the threshold can be modified based on certain conditions of the destination system 130 and/or the network 120 connecting the decoder 134 and the encoder 106. For example, the encoder 106 could be adapted to determine the jitter associated with the network 120, such as by transmitting a number of ping requests over the network 120. After determining the jitter, the encoder 106 could provide data representing this jitter to the CSCL 200. The CSCL 200 could then adjust the value of the threshold based on the jitter measured by the encoder 106. Alternatively, the CSCL 200, the jitter buffer 132, and/or the decoder 134 could determine the jitter of network 120 directly and adjust the threshold accordingly.

By compensating for the clock skew between the audio encoder 106 and the decoder 134, the present invention provides a means to stabilize the amount of data stored in a jitter buffer, thereby minimizing the potential for buffer underflow/overflow. Accordingly, in one manner, the present invention provides an essentially real-time, self-regulating packet adjustment means or arrangement, resulting in a very flexible, highly automated clock skew compensation mechanism.

As discussed previously, in at least one embodiment, the CSCL 200 is implemented as executable instructions executed by a processor, such as a digital signal processor (included in one embodiment of the decoder 134). A high-level pseudocode representation, provided below, of one such implementation is herein referred to as the CSCL Algorithm.

```
CSCL Algorithm:
constants:
SampleSize - the number of bytes in a sample/frame (depends on coder type)
threshold - the desired number of bytes accumulated in the jitter buffer before starting transmission
AlterInterval - the number of packets in a sequence of packets from which packets are selected to be altered
variables:
PacketsReceived - the number of packets received at the jitter buffer since the last reset
BytesReceived - the number of bytes received at the jitter buffer since the last reset
PacketsTransmitted - the number of packets output from the jilter buffer since the last reset
BytesTransmitted - number of bytes output from the jitter buffer since the last reset
BytesToCompensate - the number of bytes in the jitter buffer in excess/shortage of the threshold
        (determined as BytesReceived - BytesTransmitted - threshold)
SamplesToCompensate - the number of samples in the jitter buffer in excess/shortage of the threshold
BytesToCompensatePerPacket - the number of bytes to be compensated per packet
BytesCompensated - the number of bytes compensated
PacketsSinceAlter - the number of packets output from the jitter buffer since the last alter
Interval - the distribution interval by which packets are selected for altering within an AlterInterval
packet - a packet received from an audio encoder and to be output to an audio decoder
function Packet_In(packet):
    PacketsReceived = PacketsReceived + 1
    BytesReceived = BytesReceived + PacketSize
    if((PacketsReceived % AlterInterval) = 0) then:
        BytesToCompensate = BytesReceived - BytesTransmitted - threshold
        SamplesToCompensate = BytesToCompensate/SampleSize       PacketsToAlter = min(SamplesToCompensate, AlterInterval)
        if (PacketaToAlter ≠ 0) then:
            Interval = AlterInterval/PacketsToAlter
            BytesToCompensatePerPacket = BytesToCompensate/PacketsToAlter
        else:
            Interval = AlterInterval ÷ 1
    endif
End Packet_In
function Packet_Out(packet):
    PacketsSinceAller = PacketsSinceAlter + 1
    BytesTransmitted = BytesTransmitted + PacketSize
        if((PacketsSinceAlter = Interval) && (BytesToCompensate ≠ 0)) then:
            BytesCompensated = min(BytesToCompensate, BytesToCompensatePerPacket)
            AlterPacket(packet, BytesCompensated)
            PacketsSinceAlter = 0
            BytesToCompensate = BytesToCompensate - BytesCompensated
        endif
End Packet_Out
```

The CSCL algorithm is illustrated with reference the flowcharts of FIGS. 4 and 5. Flowchart 400 illustrates the flow of the function $Packet_{13}In()$ performed each time a packet is received by the jitter buffer 132. Flowchart 500 illustrates the flow of the function Packet_Out( ) performed each time a packet output from the jitter buffer 132. The functions Packet_In( ) and/or Packet_Out( ) can be implemented as an extension of the jitter buffer 132, as a separate logic component, or as part of the decoding process performed by the decoder 134. The values of the variables of the CSCL algorithm can be set to predetermined values every time a system implementing the CSCL algorithm is reset. Likewise, certain variables and constants, such as the AlterInterval, threshold, and SampleSize, have different values for different encoding/decoding systems, and can be configured as such whenever the source of encoded audio data changes.

As illustrated in FIG. 4, the function Packet_In( ), which is performed by the CSCL 200 every time a packet is received for input to the jitter buffer 132, initiates with step 410, wherein the variable PacketsReceived is incremented by one. The variable PacketsReceived, used herein, represents the number of packets received by the jitter buffer 132 since the operation of the CSCL 200 was last reset. Likewise, the variable BytesReceived is incremented by the size of the packet received, where the variable PacketSize represents the packet size. The variable BytesReceived represents the number of bytes received by the jitter buffer 132 since the last reset, and can be calculated by taking the product of the variables PacketsReceived and PacketSize.

In step 420, the modulus of the variable PacketsReceived by the constant AlterInterval is determined, where the constant AlterInterval represents the alter interval used by the CSCL 200. If the result of the modulus operation is equal to zero, then the Packet_In( ) function continues to step 430, else the Packet_In( ) function terminates at step 424 until the jitter buffer 132 receives the next packet, whereupon the Packet_In( ) function is performed again for the next packet.

In step 430, the variables SamplesToCompensate and PacketsToAlter are determined, where the value of SamplesToCompensate is representative of the total number of samples to be added or removed from the packets within an alter interval, as discussed previously. The variable PacketsToAlter represents the number of packets of an alter interval to be selected for altering. The variable SamplesToCompensate can be determined by determining the variable BytesToCompensate, calculated as BytesReceived13 BytesTransmitted13 threshold, where the variable BytesReceived represents the number of bytes received since the last reset and the variable BytesTransmitted represents the number of bytes output from the jitter buffer 132 since the last reset, and the threshold is representative of the desired or optimal fullness of the jitter buffer 132. In the event that the amount of audio data stored in the jitter buffer 132 is less than the threshold, BytesToCompensate will have a negative value and if the amount of audio data is greater than the threshold then BytesToCompensate will have a positive value. The value of SamplesToCompensate then can be calculated as BytesToCompensate divided by the SampleSize, where the constant SampleSize represents the size of a sample in bytes. The sign of SamplesToCompensate equivalent to the sign of BytesToCompensate, where a positive value for SamplesToCompensate indicates that the selected packets in the alter interval are to be enlarged, and a negative value indicates that the selected packets of the alter interval are to be reduced when altered. The variable PacketsToAlter can be calculated as the absolute minimum of the variable SamplesToCompensate or the constant AlterInterval. This evaluation is performed to limit the extent of altering of packets in the alter interval, should the value of SamplesToCompensate be greater than the number of packets in the alter interval.

In step 440, the CSCL 200 determines if there is at least one packet to alter during the corresponding alter interval. If there are no packets to alter (i.e., PacketsToAlter=0), due to a relatively small difference between the actual amount of audio data in the jitter buffer 132 and the desired threshold, the value of the variable Interval is, in step 444, set to the value of AlterInterval+1 to prevent the altering of packets, as explained subsequently, and then the function Packet_In( ) terminates at step 424 until the next packet is received.

If there are packets to alter (i.e., PacketsToAlter!=0), then the values of the variables Interval and BytesToCompensatePerPacket are determined. The variable Interval, representative of a distribution interval, can be calculated as the integer division of AlterInterval by PacketsToAlter. For example, if the alter interval is set as 30 packets (AlterInterval) and it has been determined that three packets are to be altered (PacketsToAlter), then the Interval can be calculated as a 10 packet interval, whereby every tenth packet of the packets of the alter interval are altered. In one manner, the variable Interval, representative of a distribution interval, distributes the altering of packets substantially evenly among the sequence of packets of the corresponding alter interval. The variable BytesToCompensatePerPacket represents the number of bytes to add/remove from each packet selected for altering. After Interval and BytesToCompensatePerPacket have been calculated, the Packet_In( ) function terminates at step 424 until the jitter buffer 132 receives the next packet.

Figure 5:
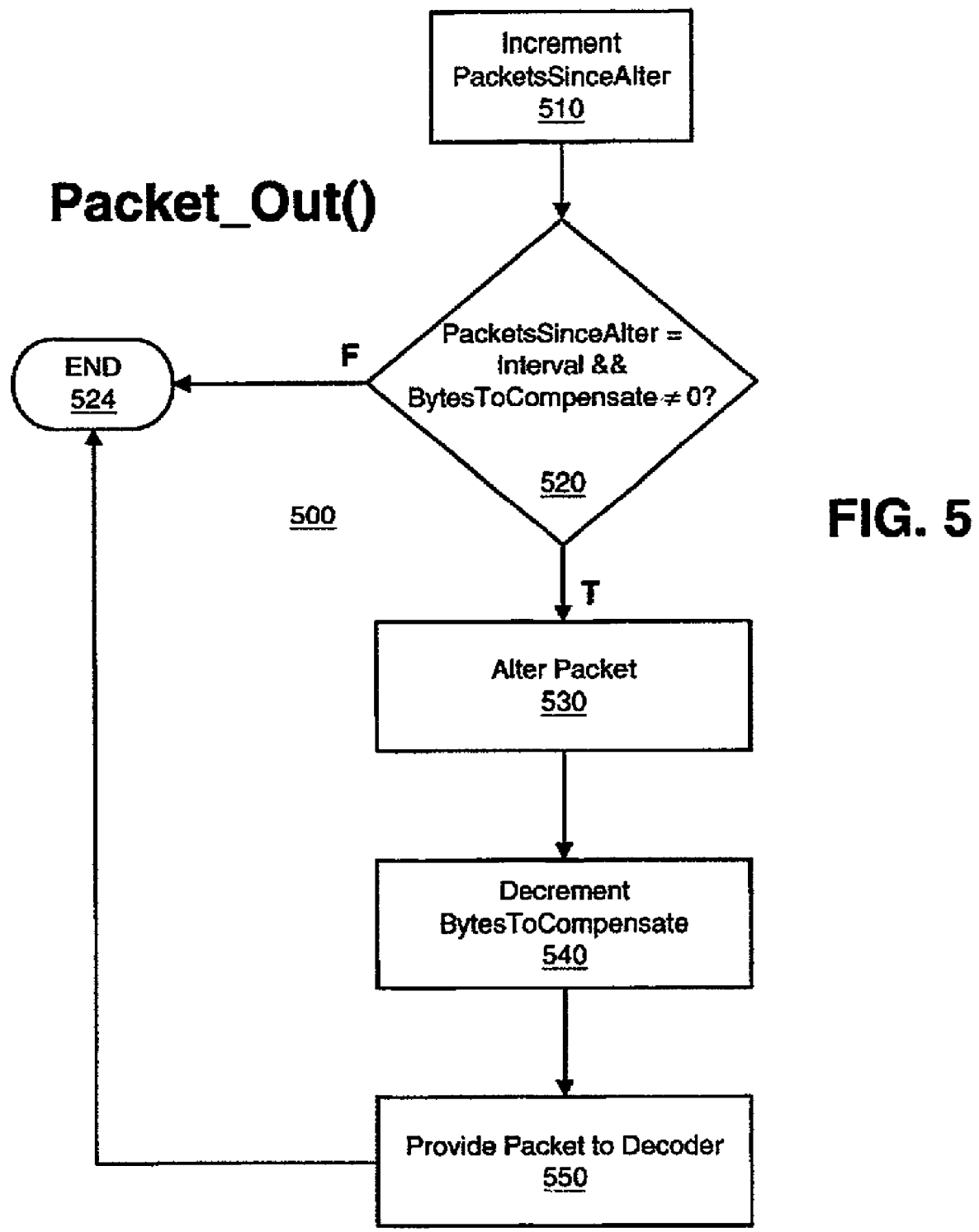

Referring now to FIG. 5, the operation of the function Packet_Out( ) is illustrated in accordance with one embodiment of the present invention. The function Packet_Out( ) is performed by the CSCL 200 each time a packet is to be output from the jitter buffer 132 and provided to the decoder 134. In one embodiment, the Packet_Out( ) function is called by the decoder 134. Alternatively, the Packet_Out( ) function can be called by the jitter buffer 132 during a packet output. The function Packet_Out( ) initiates with step 510, where the variable PacketsSinceAlter is incremented by 1. The variable PacketsSinceAlter represents a count of the number of packets output since the most recent altering of a packet, and is reset to zero after a packet is altered.

In step 520, the value of PacketsSinceAlter is compared to the value of Interval and the value of BytesToCompensate is compared to the value of zero. If PacketsSinceAlter is equivalent to Interval and BytesToCompensate is not zero, then the function Packet_Out( ) proceeds to step 530. Otherwise, the function Packet_Out( ) terminates at step 524 until the next packet is to be output.

By comparing PacketsSinceAlter to Interval in step 520, the CSCL 200 can determine if the packet being output is to be altered. Recall that Interval represents a distribution interval between packet alterations within an alter interval. Accordingly, when the number of packets since the last alter (PacketsSinceAlter) is equal to the number of packets represented by Interval, then the packet being output is one distribution interval from the last packet altered, and therefore is to be altered. In addition, by comparing BytesToCompensate with the value of zero, the CSCL 200 can determine whether any alteration is needed. In other words, if BytesToCompensate is zero, there is no need to alter the packet being output or any subsequent packets in the alter interval.

In step 530, after ensuring that the packet being output is to be altered and that the amount by which the packet is to be altered is non-zero, the variable BytesCompensated is calculated. In some cases, the number of bytes to compensate can be less than the value of BytesToCompensatePerPacket for the last packet to be altered in the AlterInterval. Therefore, BytesCompensated can be calculated as the minimum of BytesToCompensate and BytesToCompensatePerPacket to prevent excessive alteration of the last packet to be altered in the AlterInterval. After BytesCompensated is calculated, the packet being output is altered by performing the function AlterPacket(packet, BytesCompensated). The function AlterPacket( ) alters the packet being output by a number of bytes represented by BytesCompensated, where bytes of audio data are added to the packet if BytesCompensated is positive and bytes of audio data are removed from the packet if BytesCompensated is negative. It will be appreciated that the value of BytesCompensated is directly related to the number of samples to be added/removed from a packet. For example, if BytesCompensated has a value of 4 and each sample of a packet to be modified includes two bytes of audio data, then BytesCompensated represents 2 samples to be added/removed from a packet. The function AlterPacket( ) can be implemented based on any of a variety of methods of altering packets known to those skilled in the art, using the guidelines provided herein. After the packet is altered, PacketsSinceAlter is reset to zero and the value of BytesCompensated is subtracted from the value of BytesToCompensate with the resulting value being assigned to BytesToCompensate. Accordingly, if the previous value of BytesToCompensate is positive, the new value of BytesToCompensate decreases closer to zero and if the previous value of BytesToCompensate is negative, then the new value of BytesToCompensate increases closer to zero. After the new value of BytesToCompensate is determined, the function Packet_Out( ) terminates at step 524 until the next packet is output from the jitter buffer 132.

It should be noted that a number of variables are shared between the Packet_In( ) function and the Packet_Out( ) function, such as the variable Interval, BytesToCompensate, and BytesToCompensatePerPacket. The values for such variables are persistent across multiple performances of the Packet_In( ) and Packet_Out( ) functions. The values calculated during one alter interval by the function Packet_In( ) are used by the function Packet_Out( ) during the next alter interval of the output. At the end of an alter interval, the appropriate variables are reset (other than BytesReceived and BytesTransmitted). Likewise, when the source of the audio data (audio source 110) changes, the values of the variables are reset.

One advantage of at least one embodiment of the present invention is that minimal per-packet overhead is introduced during compensation of the clock skew between the encoder 106 and the decoder 134. For example, only steps 510 and 520 are performed for every packet received at the jitter buffer 132. Considering that steps 510 and 520 together typically can be implemented in less than fifty lines of executable code requiring less than 200 processing cycles, and if a microprocessor or digital signal processor executing the code operates at 100 MHz, then the total processing time for each incoming packet is 2 microseconds (μs), which is considerably less than the typical time between samples of an audio signal (e.g., around 125 μs). Likewise, the additional processing at every alter interval group of packets and the processing required to alter the packets is relatively insignificant, especially as the number of packets in an alter interval increases or as the sampling rates of the encoder and decoder converge. Accordingly, at least one embodiment of the present invention provides for a highly efficient, low overhead mechanism to compensate for the clock skew between an audio encoder and an audio decoder. In this manner, the clock skew compensation reduces the potential of the underflow or overflow of a jitter buffer associated with the decoder, resulting in an increased quality of the reconstructed audio signal.

Other embodiments, uses, and advantages of the invention will be apparent to those skilled in the art from consideration of the specification and practice of the invention disclosed herein. The specification should be considered exemplary only, and the scope of the invention is accordingly intended to be limited only by the following claims and equivalents thereof.

What is claimed is:

1. A method for processing packets of data, the method comprising the steps of:
receiving, at a jitter buffer, a sequence of packets encoded at a first sampling rate by an audio encoder, wherein each packet includes audio data having at least one sample;
determining a clock skew between the audio encoder having the first sampling rate and an audio decoder having a second sampling rate, the clock skew representative of a difference between the first sampling rate and the second sampling rate;
selecting a subset of packets from the sequence of packets based on a magnitude of the clock skew; and
altering each packet of the subset of packets before the packet is provided to the audio decoder to collectively compensate for the clock stew.

2. The method of claim 1, wherein the step of altering includes one or more of:
enlarging the packet when the first sampling rate is greater than the second sampling rate; and
reducing the packet when the first sampling rate is less than the second sampling rate.

3. The method of claim 1, further including the step of providing each packet of the sequence of packets to the audio decoder.

4. The method of claim 1, wherein the step of determining the clock skew includes determining a difference between a desired amount of data and an actual amount of data stored in the jitter buffer, wherein the difference is representative of the clock skew.

5. The method of claim 4, wherein the step of selecting the subset of packets includes the steps of:

determining a number of samples equivalent to a result of an integer division of the difference between the desired amount of data and the actual amount of data by a size of a sample;
selecting every packet of the sequence of packets when the number of samples is at least as great as a number of packets in the sequence of packets; and
selecting a number of packets equivalent to the number of samples from the sequence of packets when the number of samples is less than the number of packets in the sequence of packets.

6. The method of claim 5, wherein the step of selecting a number of packets equivalent to the number of samples includes selecting the number of packets such that the selected packets are substantially evenly distributed among the sequence of packets.

7. The method of claim 4, wherein the step of altering each of the first subset of packets includes the step of altering each packet of the subset by a number of samples, wherein a total number of samples associated with each packet is increased by the number of samples when the actual amount of data is less than the ideal amount of data, and wherein a total number of samples associated with each packet is decreased by the number of samples when the actual amount of data is greater than the ideal amount of data; and wherein a change in the amount of data represented by the subset of packets after each packet is altered is essentially equivalent to the difference between the desired amount and the actual amount of data in the jitter buffer.

8. The method of claim 1, wherein the step of enlarging the packet includes adding at least one sample to the packet, and wherein the at least one added sample is a copy of another sample of the packet.

9. The method of claim 1, wherein the step of reducing the packet includes removing at least one sample from the packet.

10. The method of claim 1, wherein a sample includes a frame.

11. A method to minimize underflow and overflow of a jitter buffer, the method comprising the steps of:
receiving, at the jitter buffer, a sequence of packets from an audio encoder having a first sampling rate, each packet of the sequence of packets including audio data having at least one sample;
determining a difference between an actual amount of data stored in the jitter buffer and a threshold, wherein the difference represents a clock skew between the first sampling rate and a second sampling rate;
selecting a subset of packets to be altered from the sequence of packets, wherein a number of packets included in the subset is based on the difference;
determining an alter amount based on a relationship between the difference and the number of packets in the subset; and
altering, by the alter amount, each packet of the subset of packets, wherein a total amount of audio data of a packet is decreased when the actual amount of data is greater than the threshold, and wherein the total amount of audio data of a packet is increased when the actual amount of data is less than the threshold.

12. The method of claim 11, wherein the actual amount of data in the jitter buffer is based on a difference between an amount of data provided to the audio decoder and an amount of data received by the jitter buffer.

13. The method of claim 11, wherein the step of selecting the subset of packets to be altered includes determining a number of samples represented by the difference, wherein the number of samples is based on a relationship between a size of a sample and a difference between the actual amount and the threshold, wherein the number of packets to be altered is equivalent to a minimum value of the number of samples and the number of packets in the sequence of packets.

14. The method of claim 11, wherein increasing the total amount of audio data of the packet includes adding at least one sample to the packet, wherein the at least one added sample is a copy of another sample of the packet.

15. The method of claim 11, wherein decreasing the total amount of audio data of the packet includes removing at least one sample from the packet.

16. The method of claim 11, wherein the alter amount is based on an integer division of the first difference by the number of packets of the subset of packets.

17. The method of claim 11, further including the step of determining a distribution interval, the distribution interval based on a relationship between the number of packets in the sequence of packets and the number of packets in the subset of packets to be altered.

18. The method of claim 17, wherein the distribution interval is based on an integer division of the number of packets in the sequence of packets by the number of packets in the subset of packets.

19. The method of claim 17, wherein the step selecting the subset of packets for altering includes selecting each packet of the sequence of packets located at a position in the sequence of the packets that is an integer distribution interval for inclusion into the subset of packets.

20. The method of claim 11, further including the step of providing each packet of the sequence of packets to an audio decoder having the second sampling rate.

21. The method of claim 11, wherein a sample includes a frame.

22. A computer readable medium, said computer readable medium comprising a set of executable instructions adapted to manipulate a processor to:
receive, at a jitter buffer, a sequence of packets encoded at a first sampling rate by an audio encoder, wherein each packet includes audio data having at least one sample;
determine a clock skew between the audio encoder having the first sampling rate and an audio decoder having a second sampling rate, the clock skew representative of a difference between the first sampling rate and the second sampling rate;
select a subset of packets from the sequence of packets based on a magnitude of the clock skew; and
alter each packet of the subset of packets before the packet is provided to the audio decoder to collectively compensate for the clock skew.

23. The computer readable medium of claim 22, wherein the instructions to manipulate the processor to alter each packet include instructions to manipulate the processor to:
enlarge the packet when the first sampling rate is greater than the second sampling rate; and
reduce the packet when the first sampling rate is less than the second sampling rate.

24. A system comprising:
an audio decoder to decode audio data at a first sampling rate;
a jitter buffer coupled to the audio decoder, wherein the jitter buffer is adapted to a store a plurality of packets of audio data from an audio encoder, the audio data encoded at a second sampling rate;
a clock skew compensation logic coupled to the audio decoder and the jitter buffer, wherein the clock skew compensation logic is adapted to:
enlarge each packet of a subset of packets by an alter amount when the first sampling rate is greater than the second sampling rate to generate a set of altered packets; and
reduce each packet of a subset of packets by an alter amount when the first sampling rate is less than the second sampling rate to generate packets.

25. The system of claim 24, wherein the clock skew compensation logic further is adapted to determine a first difference between an actual amount of audio data and a desired amount of audio data stored in the jitter buffer, where the first difference is representative of a second difference between the first sampling rate and the second sampling rate.

26. The system of claim 25, wherein a third difference between a total amount of audio data of the subset of packets and a total amount of audio data of the set of altered packets is essentially equivalent to the first difference.

27. The system of claim 26, wherein the alter amount is equivalent to a division of the third difference by a number of packets of the subset of packets.

28. The system of claim 25, wherein the clock skew compensation logic further is adapted to determine the first difference for a plurality of alter intervals, wherein each alter interval includes a sequence of packets of the plurality of packets.

29. The system of claim 28, wherein the clock skew compensation logic further is adapted to generate a set of altered packets from a subset of packets from each alter interval of the plurality of alter intervals.

30. The system of claim 24, wherein the clock skew compensation logic further is adapted to select the subset of packets essentially evenly from the plurality of packets.

* * * * *